S. HUFF.
Churn.
No. 6,389.
Patented April 24, 1849.
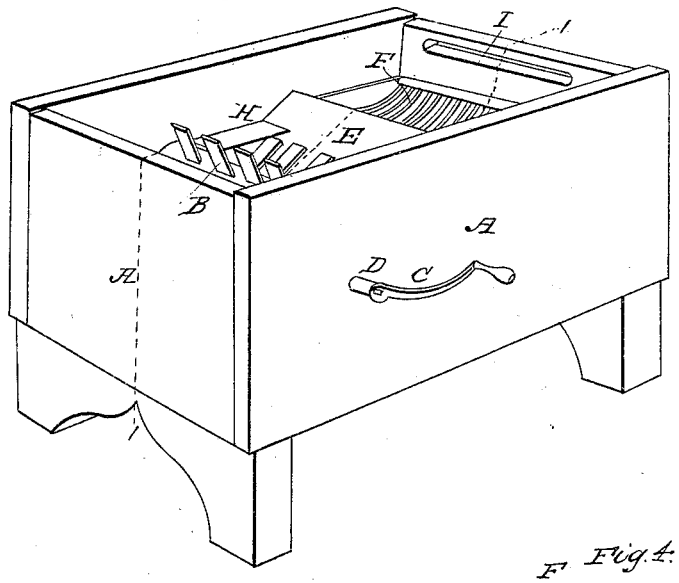
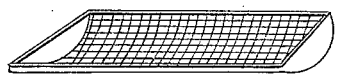
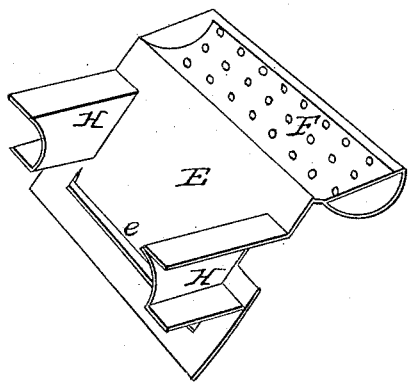
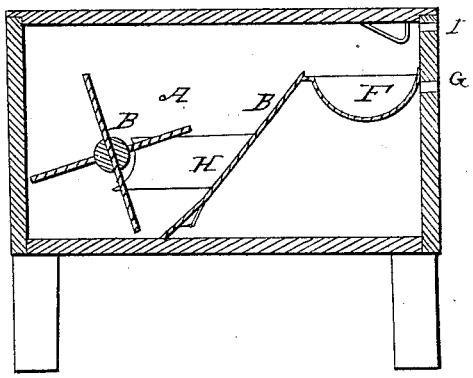

UNITED STATES PATENT OFFICE.

SAMUEL HUFF, OF NEW VIENNA, OHIO.

CHURN.

Specification of Letters Patent No. 6,389, dated April 24, 1849.

*To all whom it may concern:*

Be it known that I, SAMUEL HUFF, of New Vienna, in the county of Clinton and State of Ohio, have invented certain new and useful Improvements in Churns, the construction and operation of which are described as follows, reference being had to the annexed drawings of the same, making part of this specification, in which—

Figure 1 is a perspective view, Fig. 2 is a vertical section through the line 11 of Fig. 1; and Fig. 3 is a perspective view of the air tubes inclined plane and strainer. Fig. 4 is a view of a sieve strainer detached.

The same letters indicate the same parts in all the figures.

It is well known that in the process of churning the separation of the cream into butter and butter milk is gradual and little by little, until the operation is complete, a very considerable time generally elapsing between the formation of the first lumps of butter, and the final separation of the whole, that first formed being in the mean time beaten by the continued action of the dashers until worked into a greasy mass, having a greatly deteriorated flavor, but as the butter formed, during the first, last, and all the intermediate stages of the process is mixed up into a homogeneous mass, during the operation of salting, and working out the buttermilk, the injury done to the first formed portion is only manifest after the butter is prepared for market, by the impaired quality of the whole mass.

The virgin or first formed butter is peculiarly rich in that nutty sweetness of flavor and waxiness of texture which characterizes superior butter, and it is only by collecting this the instant it is formed that the choicest butter is to be obtained.

My invention and improvement consists in arranging a strainer in any kind of a churn suitable for the purpose, in such a manner that the dasher will elevate the cream upon it, which will of course run through it and down again, in a series of small streams or jets which exposes it during its descent through the atmosphere in the most favorable condition for that agent to act upon it, the butter as soon as formed being retained by the strainer, to be removed when accumulated in sufficient quantity to render that operation necessary.

In the accompanying drawings the external form of the churn (A) is represented as being oblong and rectangular, but it may be of any other suitable form. Within it is placed a revolving dasher (B) which is turned by a winch (C) placed on the outside of the box upon the protruding end of its axis (D). In front of the dasher an inclined plane (E) is arranged in such a manner, that it will convey the cream which is projected upon it, at a tangent from the dashers, into the strainer (F) through which it will run down to the bottom of the box and through the aperture (e) into the same compartment with the dasher, to be again elevated; the particles of butter are all separated from the milk by being retained upon the strainer; the strainer may be either perforated, reticulated, or grated, made of metal, wood, or other material, and should be of a dish form, and removable, that it may be taken out of the churn with its contents. Beneath the strainer (F) an aperture (G) is made through the box to admit a current of air, which is drawn through the tubes (H) by the centrifugal action of the dasher, and then driven out again after performing the circle through an aperture (I) which is above the strainer.

The cream should not be put into the churn in such quantities that it will rise above the axis of the dasher, but it is better to fill it about half way up the arms of the dasher, which will then work more freely.

I have given one example of the manner in which my improvements may be applied to a churn, from a careful examination of which a skillful workman would find no difficulty in understanding how they might be applied in a modified form to other churns without in any degree departing from the principle of my invention. I do not therefore deem any further description of its construction or modifications necessary.

The preliminary preparation, and the management of the cream during the operation of separating the butter therefrom are the same as in the ordinary churn, except in the particulars enumerated.

Having thus described the construction and operation of my improved churn, what I claim as my invention, and desire to secure by Letters Patent is—

The method of exposing the cream thoroughly to the action of the atmosphere, and separating the butter therefrom at the same time as soon as formed, by means of the air tubes and strainer, in combination with the dasher arranged substantially as herein set forth.

SAMUEL HUFF.

Witnesses:
WM. S. MORGAN,
JOHN MAYERS.